US012663062B2

(12) United States Patent
Huang et al.

(10) Patent No.: US 12,663,062 B2
(45) Date of Patent: Jun. 23, 2026

(54) DIFFERENTIAL AND MOVEABLE POWER TOOL HAVING THIS DIFFERENTIAL

(71) Applicant: Techtronic Cordless GP, Anderson, SC (US)

(72) Inventors: Rong Wei Huang, Guangdong (CN); You Liang Chen, Guangdong (CN); Ming Qi Li, Guangdong (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 19/020,421

(22) Filed: Jan. 14, 2025

(65) Prior Publication Data

US 2025/0230865 A1 Jul. 17, 2025

(30) Foreign Application Priority Data

Jan. 17, 2024 (CN) .......................... 202410069435.5

(51) Int. Cl.
*F16H 48/08* (2006.01)
*A01D 34/68* (2006.01)
(Continued)

(52) U.S. Cl.
CPC ............. *F16H 48/08* (2013.01); *F16H 48/40* (2013.01); *A01D 34/6812* (2013.01);
(Continued)

(58) Field of Classification Search
CPC .......... F16H 48/24; F16H 48/40; F16H 48/28; F16H 48/29; F16H 2048/282;
(Continued)

(56) References Cited

U.S. PATENT DOCUMENTS 3,258,993 A * 7/1966 Dupras ................... F16H 48/08
475/234
3,474,689 A * 10/1969 Young ..................... F16H 48/22
192/113.36
(Continued)

FOREIGN PATENT DOCUMENTS

JP S51133925 U 10/1976
KR 20060057264 A * 5/2006
WO WO-2025016617 A1 * 1/2025 ............. F16H 48/28

OTHER PUBLICATIONS

European Search Report Corresponding to Application No. 25150240 dated May 13, 2025.

*Primary Examiner* — James J Taylor, II
(74) *Attorney, Agent, or Firm* — Dority & Manning, P.A.

(57) ABSTRACT

A differential for a moveable power tool includes an input mechanism, an output gear, a first transmission component and a second transmission component. The input mechanism includes a main input end and an auxiliary input end. When meshing of the output gear and a main input mechanism fails, the first transmission component and the second transmission component engage, and the second transmission component in said engaged state drives the first transmission component to rotate in a predetermined direction, so that the auxiliary input end inputs movement to the output gear. The differential can guarantee the effectiveness and stability of movement transfer, and reduces the occurrence of slippage.

15 Claims, 14 Drawing Sheets

A-A

(51) Int. Cl.
    *F16H 48/24*        (2006.01)
    *F16H 48/28*        (2012.01)
    *F16H 48/40*        (2012.01)

(52) U.S. Cl.
    CPC ...... *A01D 2034/6837* (2013.01); *F16H 48/24*
              (2013.01); *F16H 2048/282* (2013.01)

(58) Field of Classification Search
    CPC ......... F16H 48/08–2048/087; A01D 34/6806;
             A01D 34/6812; A01D 34/6837; A01D
                                    69/06
    See application file for complete search history.

(56)                 References Cited

U.S. PATENT DOCUMENTS

| | | | |
|---|---|---|---|
| 5,037,362 A * | 8/1991 | Teraoka | F16H 48/08 |
| | | | 475/233 |
| 6,354,978 B1 * | 3/2002 | Brackin | F16H 48/34 |
| | | | 475/237 |
| 6,470,988 B1 | 10/2002 | Beesley | |
| 10,781,904 B2 * | 9/2020 | Hirota | F16H 48/14 |
| 2006/0240394 A1 | 10/2006 | Smith et al. | |

* cited by examiner

A-A

DIFFERENTIAL AND MOVEABLE POWER TOOL HAVING THIS DIFFERENTIAL

CROSS-REFERENCE TO RELATED APPLICATIONS

The present application claims priority to CN202410069435.5 filed on Jan. 17, 2024, the disclosure of which is incorporated by reference herein in its entirety.

TECHNICAL FIELD

The present invention relates to the field of power tools, in particular to a differential and a moveable power tool that has this differential; the moveable power tool particularly is a garden tool, such as a lawnmower or snowblower.

BACKGROUND ART

In conventional moveable power tools, a differential is usually arranged between left and right wheels, and the differential can act to cause the moveable power tool to produce different left and right wheel speeds during turning, or when passing over a special road surface, and, for example, if frictional forces between the left and right wheels and the road surface are different, it is also necessary to cause the left and right wheel speeds to be different. However, existing differentials use unitary power sources for power input to axles, and, as soon as movement input from this power input power source for the left and right wheels fails, the axle cannot be driven to rotate, which causes a wheel slip.

Therefore, there is a need to provide a differential and a moveable power tool that has this differential tool, to at least partially solve the above-mentioned problem.

SUMMARY OF THE INVENTION

The present invention provides a differential and a moveable power tool that has this differential. The differential of the present invention is capable of enabling an input component to provide power input to an output component at two positions. As soon as a movement input from a main input end to an output component fails (e.g. a gear does not properly mesh, gear idling, etc.), an auxiliary input end acts on the output component to continue to provide a movement input to the output component, and the output component can still rotate with the input component. Therefore, the differential provided by the present invention can guarantee the effectiveness and stability of movement transfer, and reduces the occurrence of slippage. Further, the present invention, in certain aspects, enables engagement failure between the main input end and the output component to cause engagement between the auxiliary input end and the output component, thereby further improving the stability and effectiveness of the movement transfer, and thus further reducing the probability of slippage.

According to an aspect of the present invention, a differential is provided, the differential being constructed to be capable of driving axles mounted on both left and right sides thereof to rotate around an axis of the axle, and the differential comprising:

an input mechanism, the input mechanism comprising a main input end and an auxiliary input end that rotate as an integral whole around the axis;

an output gear, the output gear and the axle being fixedly engaged in a rotation direction, and the output gear being located between the main input end and the auxiliary input end, wherein the output gear is capable of meshing with the main input end;

a first transmission component, the first transmission component and the output gear being fixedly connected to each other in the rotation direction; and a second transmission component, the second transmission component and the auxiliary input end being fixedly connected to each other in the rotation direction, wherein the first transmission component and the second transmission component face each other, and, when meshing of the output gear and the main input mechanism fails, the first transmission component and the second transmission component engage, and the second transmission component in said engaged state drives the first transmission component to rotate in a predetermined direction.

In one embodiment, an axial displacement gap is provided between the first transmission component and the output gear, an elastic member is provided at the axial displacement gap, and, when the meshing of the output gear and the input mechanism fails, the output gear squeezes the elastic member so that the first transmission component engages with the second transmission component under an elastic force of the elastic member, and, preferably, the elastic member is in a compressed state both when the first transmission component and the second transmission component are in an engaged state and a disengaged state.

In one embodiment, the first transmission component and the second transmission component form annular plate-shaped structures that are approximately perpendicular to the axis and surround the axis, the second transmission component has a protrusion facing the first transmission component, the first transmission component has a depressed part facing the second transmission component, and, in the engaged state, the protrusion can be located within the depressed part, and a circumferential dimension of the depressed part is greater than a circumferential dimension of the protrusion, and, preferably, the protrusion and the depressed part engage by means of slanted faces to facilitate the protrusion leaving or entering the depressed part.

In one embodiment, the input mechanism comprises:

a differential shell, wherein the differential shell forms the auxiliary input end; and a planetary gear system that is located at an axial centre position of the differential shell, the planetary gear system comprising:

an outer ring gear for receiving outer movement input; and multiple planet gears that are mounted on a radial inner side of the outer ring gear, the multiple planet gears forming the main input end.

In one embodiment, the differential shell comprises a pair of shell halves that abut each other in an axial direction, and the outer ring gear is at least partially fixed between the pair of shell halves.

In one embodiment, the multiple planet gears are bevel gears, a self-rotating shaft of each of the planet gears extends in a radial direction, and an axial inner end of the input gear also correspondingly forms a bevel gear.

In one embodiment, the differential further comprises a central assembly member located at the centre thereof, wherein a radial outer end of each of the self-rotating shafts is inserted in a corresponding receiving hole of the outer ring gear, and a radial inner end of each of the self-rotating shafts is inserted in a self-rotating shaft mounting hole of the central assembly member, and, preferably, an axial inner end of the axle is inserted in the corresponding receiving hole of the central assembly member.

In one embodiment, the output gear comprises an axial outer section and an axial inner section formed as an integral whole, an outer diameter of the axial outer section being less than an outer diameter of the axial inner section, and both the first transmission component and the second transmission component surrounding the axial outer section.

In particular, the axle runs through the whole of the input gear and engages with inner teeth of the input gear.

In one embodiment, the differential shell of the differential has a stepped construction that is adapted to the shape of the output gear.

In one embodiment, the first transmission component and the output gear are fixed in a keying manner, and/or the second transmission component and the auxiliary input end are fixed in a keying manner.

According to another aspect of the present invention, a moveable power tool is provided, the moveable power tool comprising the differential and the axles mounted on both the left and right sides of the differential according to any one of the above solutions.

In one embodiment, the moveable power tool is a lawnmower or a snowblower.

BRIEF DESCRIPTION OF THE DRAWINGS

To better understand the above and other objectives, features, advantages and functions of the present invention, reference may be made to the preferred embodiments shown in the drawings. In the drawings, identical or similar reference signs denote identical or similar components. It should be understood by a person skilled in the art that the drawings are intended to schematically illustrate preferred embodiments of the present invention, without imposing any limitations on the scope of the present invention, and that the various components in the drawings are not drawn to scale.

KEY TO REFERENCE SIGNS

Figure 1A:
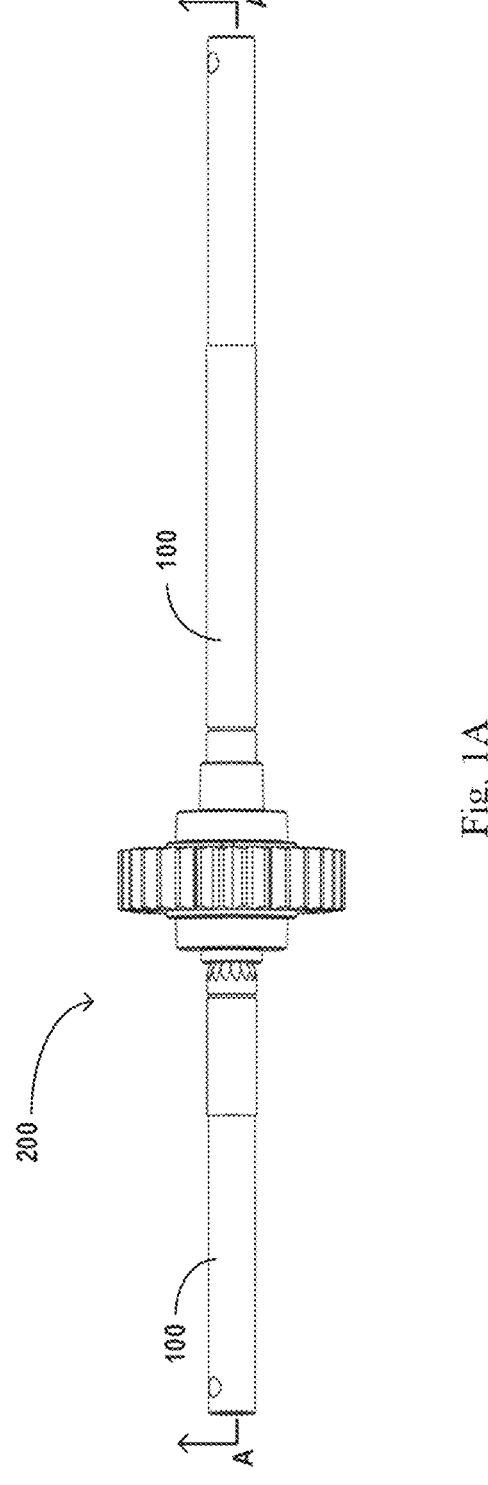
FIG. 1A is an outer profile view of a differential according to some preferred embodiments of the present invention, wherein the differential is fitted with one axle respectively on both left and right sides.

100 axle
101 axle keyway
102 axial inner end of axle
200 differential
210 differential shell
211 differential shell half
2111 shaft hole
2112 middle section
2113 mounting base
2114 shell keying protrusion
2115 mounting base protrusion
220 input mechanism
221 planetary gear system
230 outer ring gear
231 circumferential outer tooth
232 outer ring gear slot
233 assembly central member
2331 self-rotating shaft mounting hole
240 bolt
250 planet gear
251 self-rotating shaft
260 output gear
261 axial inner end tooth
262 gear keying protrusion
263 axial inner section
264 axial outer section
265 inner tooth
270 washer
280 second transmission component
281 second transmission component keying slot
282 protrusion
290 first transmission component
291 first transmission component keying slot
292 depressed part
293 base section
2010 elastic member
2011 axial gap
283, 294 slanted face
320 lawnmower
321 rear wheel
322 front wheel
323 handrail

DETAILED DESCRIPTION OF EMBODIMENTS

A cleaning device according to the present invention is described in detail below with reference to the drawings. The embodiments set out below are merely preferred embodiments according to the present invention. A person skilled in the art could think of other ways of implementing the present invention on the basis of the preferred embodiments, and such other ways shall likewise fall within the scope of the present invention.

Figure 8:
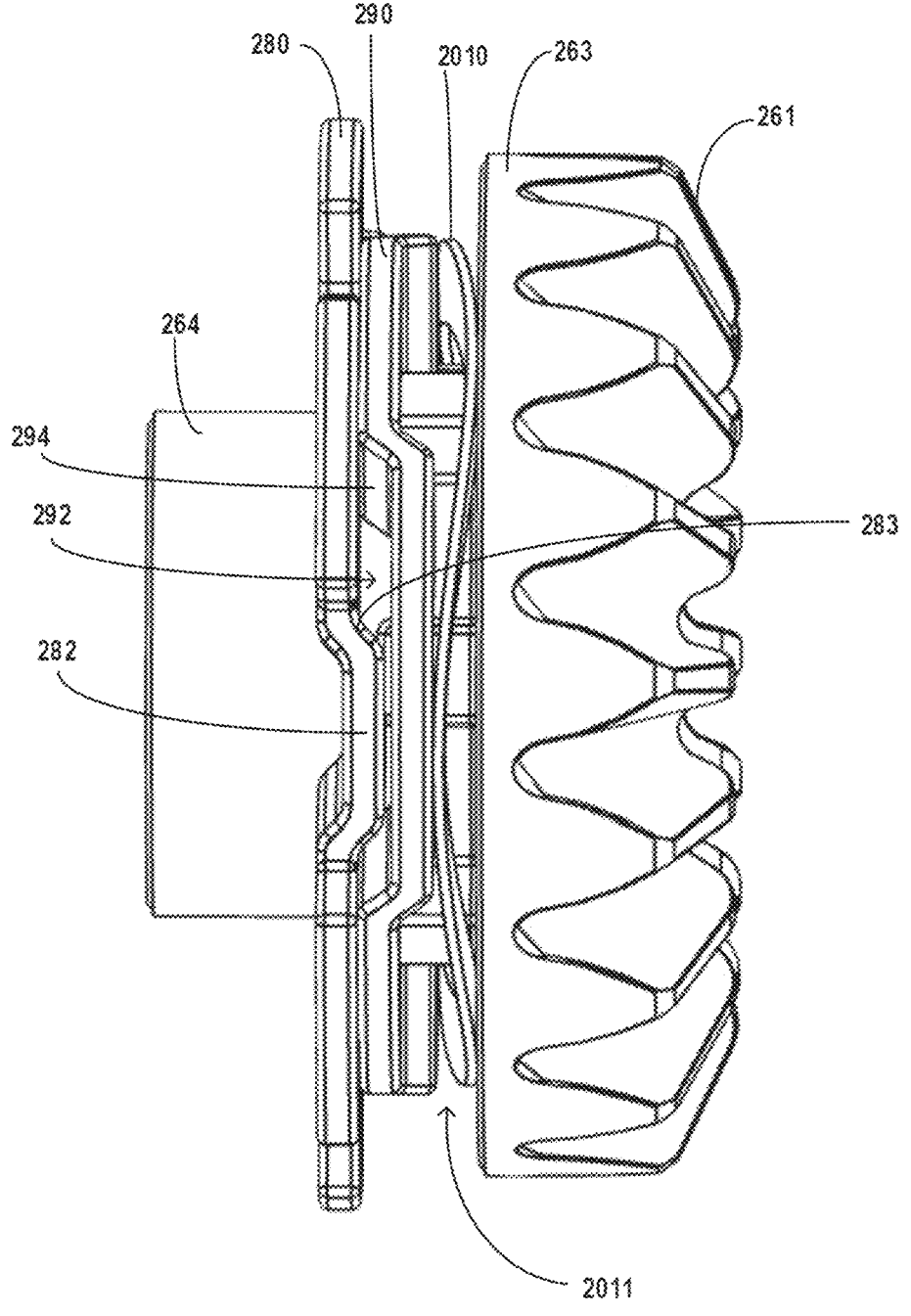
FIG. 8 is another view of the structure shown in FIG. 7, and in this drawing the first transmission component and the second transmission component are in an engaged state.
Figure 9:
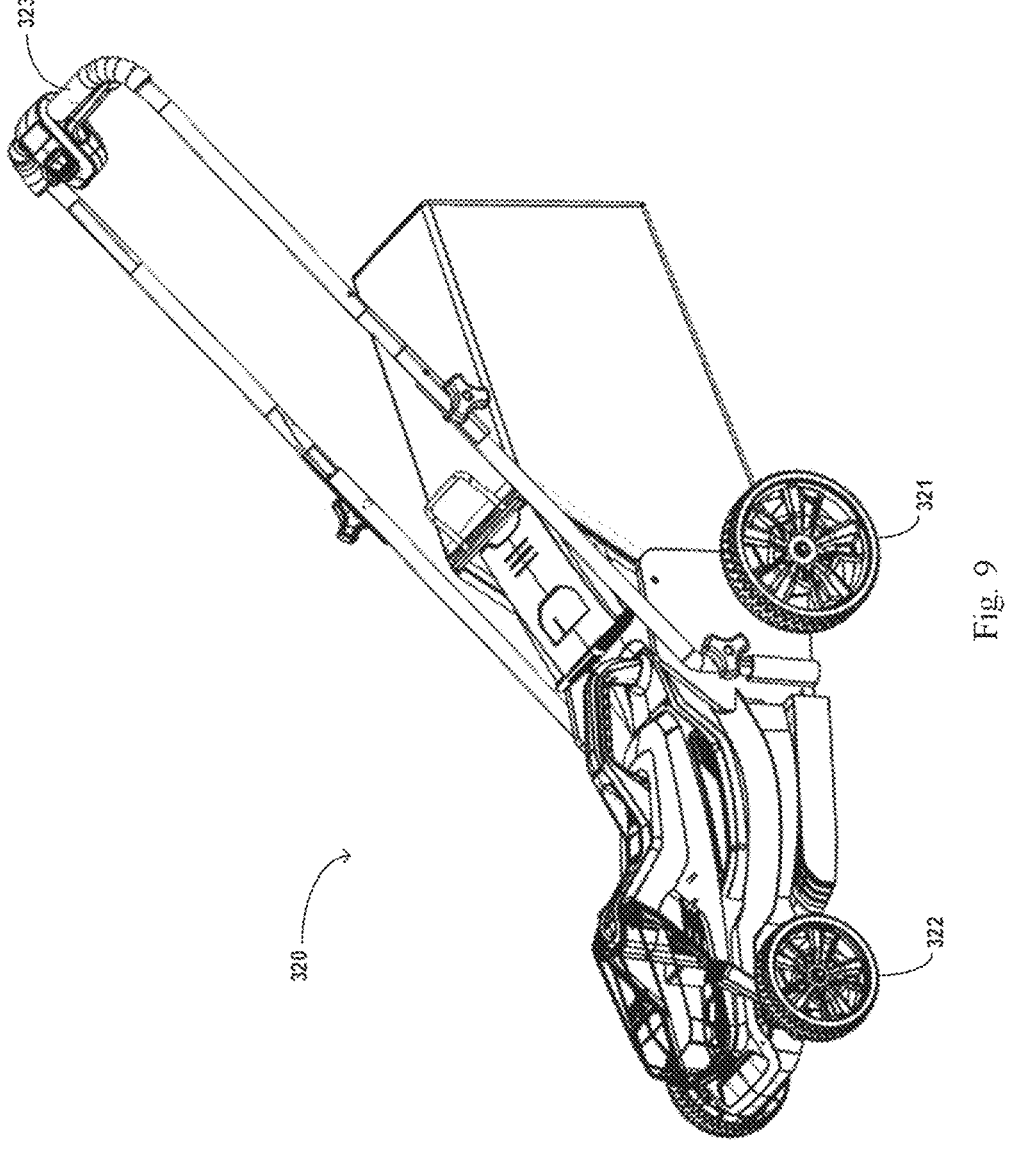
FIG. 9 is a power tool according to some preferred embodiments of the present invention, wherein this power tool is internally provided with the differential shown in FIGS. 1A-8.

The present invention provides a differential and a moveable power tool that has this differential, such as a lawnmower, a snowblower, etc. FIGS. 1A-8 show a differential according to some preferred embodiments of the present invention, the differential being constructed to be capable of driving axles mounted on both left and right sides thereof to rotate around an axis of the axle (see FIG. 1). The differential shown in FIGS. 1A-8 is particularly suitable for garden tools; FIG. 9 shows an example of a garden tool.

The garden tool shown in FIG. 9 is a lawnmower 320; in other embodiments, the moveable power tool can also be a snowblower. The lawnmower 320 shown in FIG. 9 is a four-wheel power tool with front wheels 322 and rear wheels 321; in some embodiments, a handrail 323 that an operator can hold to operate the power tool is also provided. The differential shown in FIGS. 1A-8 can be used to connect the pair of rear wheels 321 to provide a differential function between this pair of rear wheels when one of the rear wheels of the lawnmower 320 slips or idles. The axles 100 on both sides of this differential 200 (see FIG. 1) may respectively be input components for the pair of rear wheels 321 of the lawnmower 320, for example may respectively act as shafts of the pair of rear wheels 321 of the lawnmower 320, or may be connected to shafts of the pair of rear wheels 321 of the lawnmower 320 by means of a transmission, etc.

It should be noted that the main operating purpose of the garden tool is gardening rather than carrying passengers; moreover, the garden tool is often faced with a large number of more extreme usage conditions, such as silt, snow and ice, thick grass, etc., and then further taking into account special properties of the garden tool, such as volume, deadweight, driving range and cost, the overall consequence is that the garden tool is greatly different to a passenger-carrying vehicle, and the differential of the present invention is especially suited for a garden tool with the above characteristics.

It should first be explained that directional and positional terms in the present invention should be understood as meaning relative directions and positions, and should be interpreted with reference to the normal orientation of the differential and the moveable power tool in a state of use. For example, "axial" and "axial direction" can be understood as an extension direction of the X-axis of the axle; "radial" and "circumferential" can be understood as a radial direction and circumferential direction in relation to this axial direction; "inward" refers to a direction pointing toward the centre of the differential; "outward" refers to a direction pointing away from the centre of the differential; and "rotation direction" can be understood as a direction of rotation around the X-axis. In the present invention, a left-right direction and the axial direction are collinear.

Figure 2:
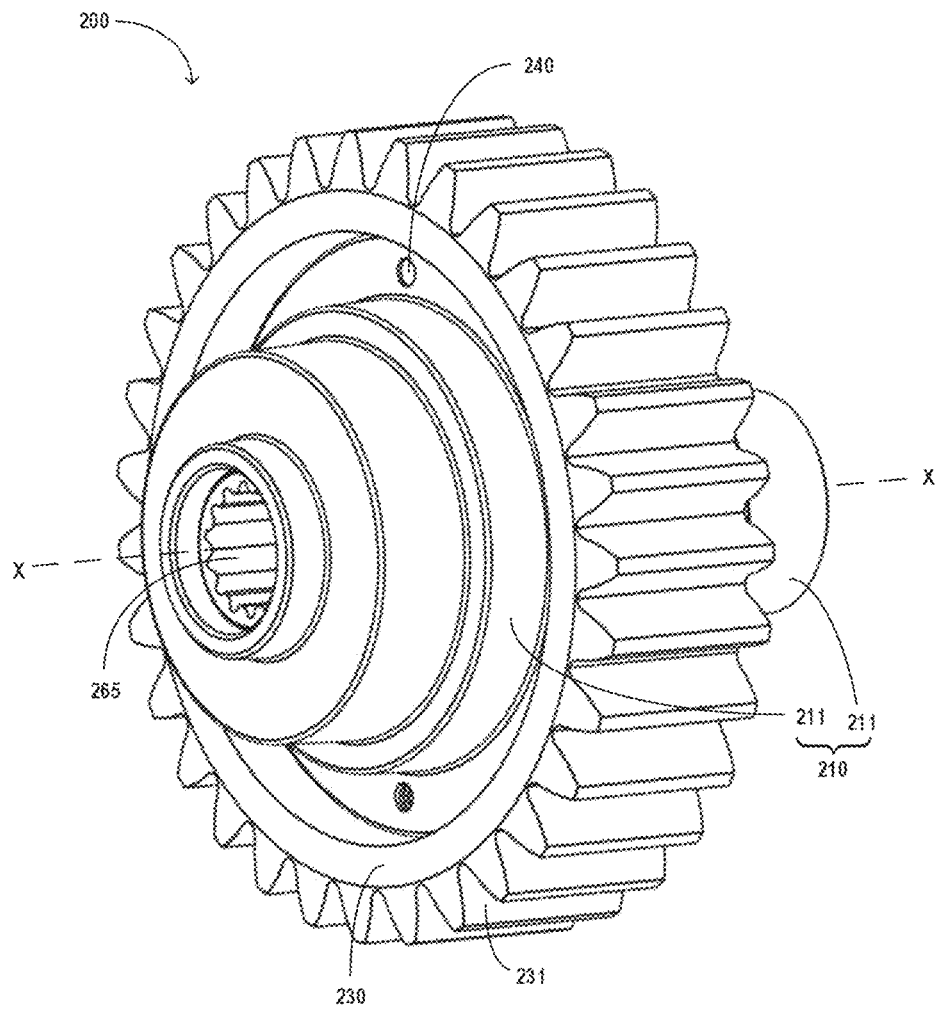
FIG. 2 is a 3D view of the differential shown in FIG. 1A.
Figure 3:
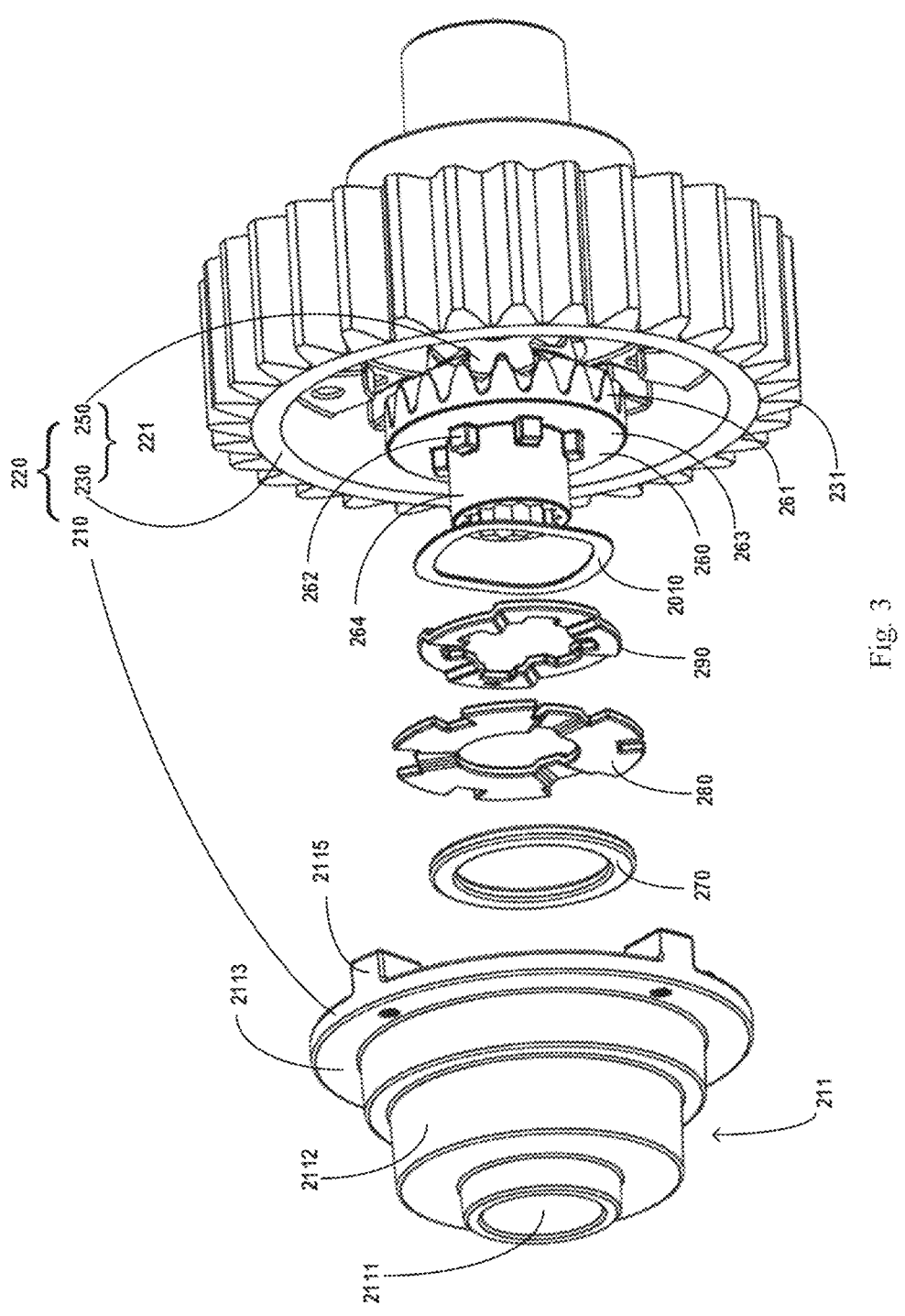
FIG. 3 shows an exploded view of the differential shown in FIG. 2, and FIG. 3 has an approximately identical viewing angle to FIG. 2.

Referring to FIGS. 2 and 3, the differential 200 comprises an outer ring gear 230, a differential shell 210, multiple planet gears 250 and an output gear 260. The differential shell 210 further comprises a pair of shell halves 211 that abut each other in an axial direction, and the outer ring gear 230 is at least partially fixed between the pair of shell halves 211. The pair of shell halves 211 and the outer ring gear 230 together define an inner chamber of the differential 200.

Returning to FIGS. 1A-1E, the pair of shell halves 211 and the components contained therein have approximately the same or a similar structure, and the outer ring gear 230 is arranged between the pair of shell halves 211 and acts as a common input component for the pair of axles 100. The output gear 260, the first transmission component 290, the second transmission component 280 and the elastic member 2010 are all provided in each shell half. The specific arrangement and assembly and operating means of the output gear 260, the first transmission component 290, the second transmission component 280 and the elastic member 2010 will be described in detail later. For brevity, the description of FIGS. 2-8 below will only be extended to one differential shell 210 and the internal structure thereof.

Figure 6A:
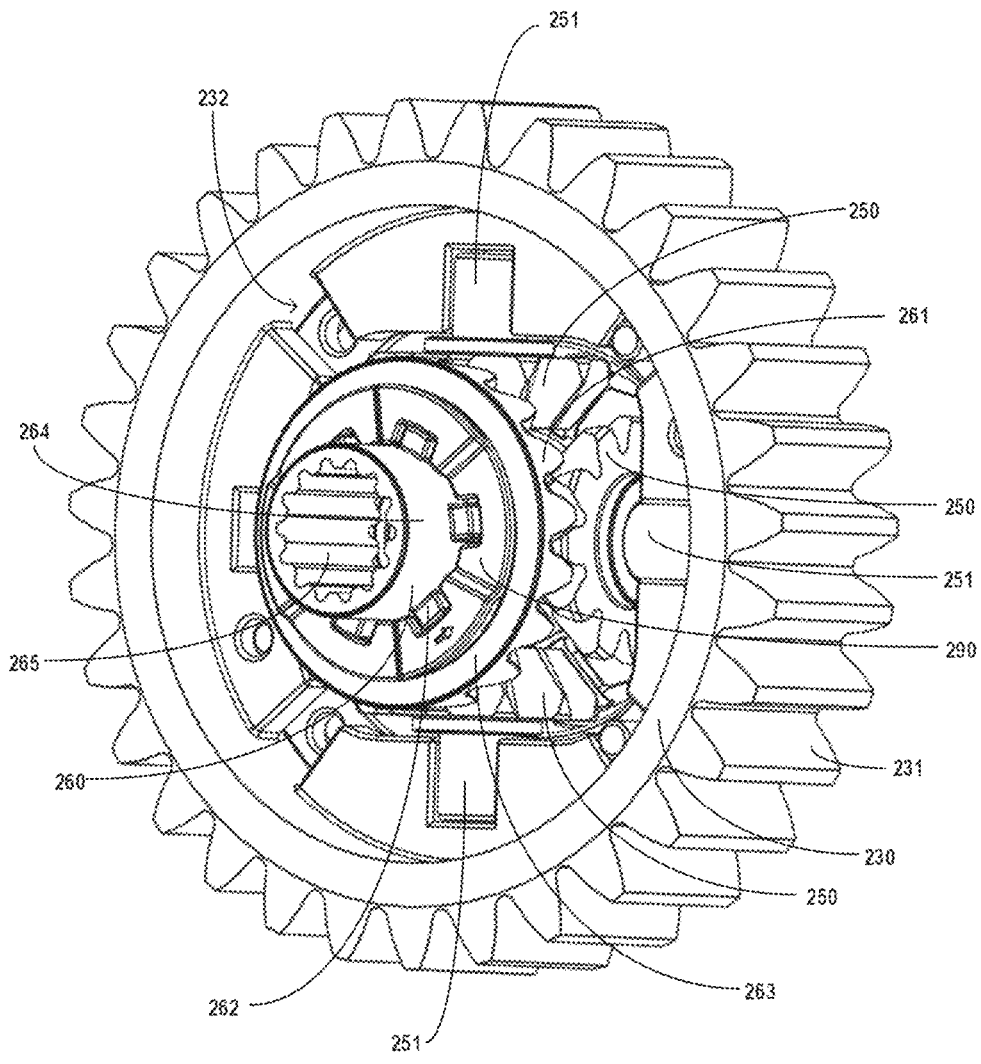
FIG. 6A is a schematic drawing of a differential after the differential shell half and the second transmission component have been removed, and this drawing shows a construction of engagement between the first transmission component and an output gear.

Referring to FIGS. 2 and 3, each shell half 211 comprises a shaft hole 2111 for an axle 100 to pass through and an annular mounting base 2113 that abuts an inner ring gear; the mounting base 2113 is further provided with a mounting base protrusion 2115 that extends axially inward, and an outer ring gear slot 232 is correspondingly provided on the outer ring gear 230 (see FIG. 6A). When the mounting base protrusion 2115 is inserted into the outer ring gear slot 232, this pair of shell halves 211 and the outer ring gear 230 can be locked here using a bolt 240 (see FIG. 2), so that the pair of shell halves 211 and the outer ring gear 230 can rotate as a whole. Circumferential outer teeth 231 on the outer ring gear 230 are used for meshing with a power source of the differential 200, enabling the differential 200 to rotate under the drive of the power source. Referring to FIGS. 1C and 6A, multiple planet gears 250 are mounted to a radial inner side of the outer ring gear 230, and a self-rotating shaft 251 of each planet gear 250 extends in a radial direction. Specifically, referring to FIG. 1D, a centre portion of the differential 200 is also provided with an assembly central member 233 for fitting the planet gears 250. A self-rotating shaft mounting hole 2331 that extends radially is formed on the assembly central member 233, and the self-rotating shaft 251 of each planet gear 250 is inserted into the self-rotating shaft mounting hole 2331. The multiple planet gears 250, the outer ring gear 230 and the assembly central member 233 at least partially together form a planetary gear system 221. An axial inner end 102 of the axle 100 (see FIG. 1E) extends and inserts into the assembly central member 233.

In some embodiments, the outer ring gear 230, the planet gear 250 and the differential shell 210 at least partially form the input mechanism 220 of the differential 200, and the output gear 260 at least partially forms the output mechanism of the differential 200. The output gear 260 is provided with inner teeth 265 running axially therethrough, keyways 101 of the axle 100 (see FIG. 1E) interlock with these inner teeth 265, so as to be fixed in the direction of rotation relative to the output gear 260. Rotation of the input mechanism 220 around an axis is transmitted to the output gear 260, and the output gear 260 further transmits the rotational movement to the axle 100, thus completing the transfer of the movement.

It should be noted that the term "composition" mentioned in the present invention shall be understood as an open description rather than a closed description, for example the input mechanism 220 of the present invention may also comprise other components in addition to the outer ring gear 230, the planet gears 250 and the differential shell 210; the output mechanism may also comprise other components in addition to the output gear 260; and the planetary gear system 221 may comprise other components in addition to the outer ring gear 230 and the multiple planet gears 250.

The input mechanism 220 can provide power input to the output gear 260 at two positions. That is, the input mechanism 220 has two input ends that can respectively engage with the output gear 260. The output gear 260 is located between the two input ends. Specifically, the main input end of the input mechanism 220 may comprise the planet gears 250, and the auxiliary input end of the input mechanism 220 may comprise the differential shell 210. The modes of movement output of the main input end and the auxiliary input end to the output gear 260 are discussed separately below.

When there is no difference in speed between the left and right sides of the differential 200, rotation of the outer ring gear 230 drives the planet gears 250 to revolve, and the planet gears 250 engage with axial inner end teeth 261 of the output gear 260, thereby driving the output gear 260 to rotate. The planet gears 250 and the axial inner end teeth 261 of the output gear 260 may all be bevel gears. During this process, the planet gear 250 does not revolve around its own axis, and therefore the two output gears 260 located on the left and right sides of the outer ring gear 230 have the same speed and direction of rotation, hence the left and right axles 100 of the differential 200, under the drive of the differential 200, rotate in the same direction as the differential 200. The differential 200 only transmits movement when no speed difference is present.

Different speeds may occur on the left and right sides of the differential 200 when a moveable power tool turns or one of the tyres enters into an area of abnormal resistance such as mud or snow. At this point, a decrease in the speed of the axle 100 on one side causes the planet gear 250 to rotate around its own axis, causing a difference in speed between the output gears 260 on the left and right sides of the outer ring gear 230. In such a case, the output gear 260, which is fixed in the direction of rotation of the axle 100, may disengage from the planet gear 250, which causes the input of movement of the main input end of the input mechanism 220 to the output gear 260 to fail, and, if no other input source is available, then the axle 100 on this side will be unable to continue to rotate. In order to solve this problem, an auxiliary output end of the input mechanism 220 is able to function when meshing fails between the main input end and the output gear 260, continuing to output movement to the output gear 260.

Figure 1B:
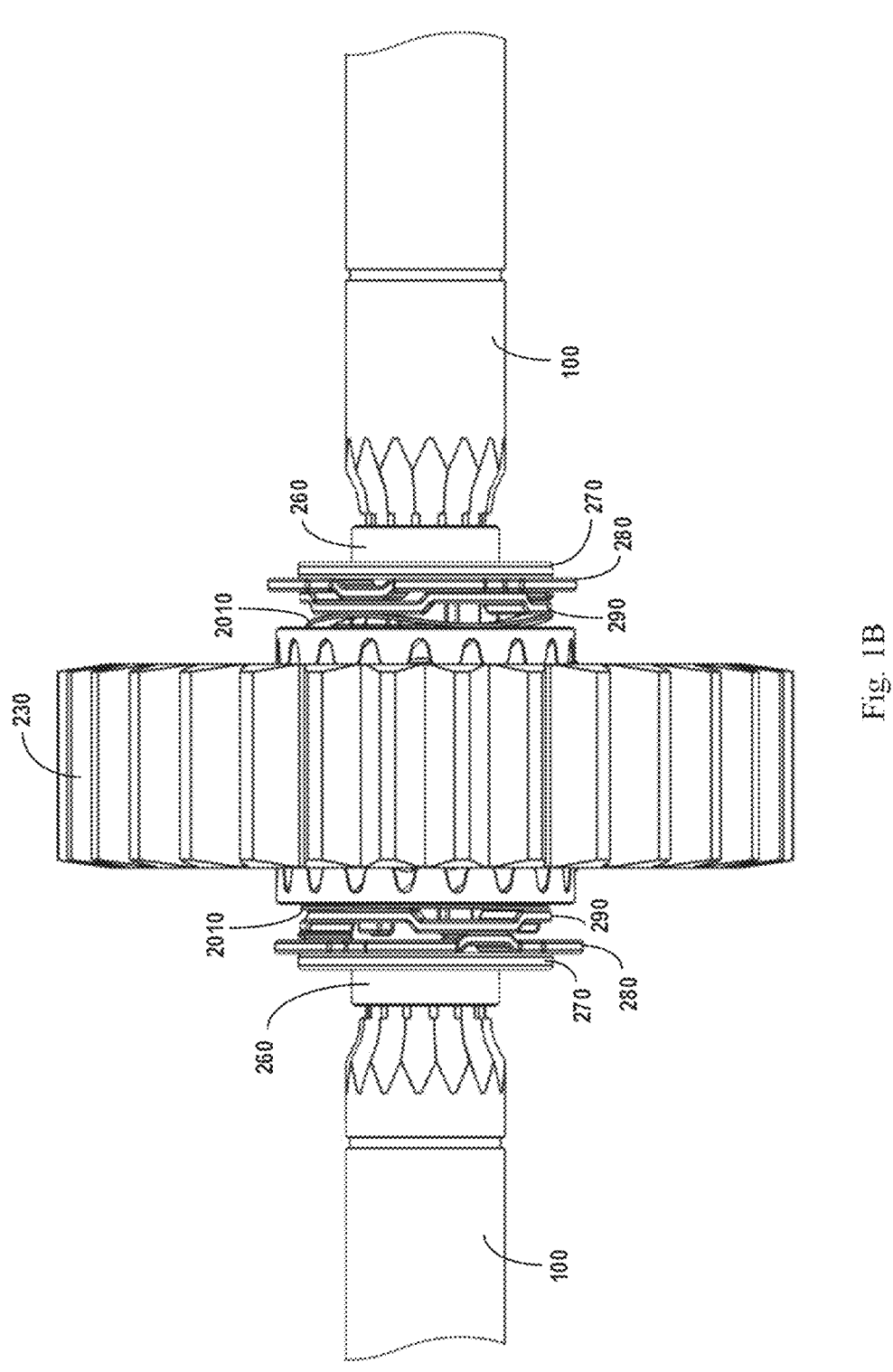
FIG. 1B is a schematic drawing after a shell of the differential in FIG. 1A has been removed, wherein the axles on both sides of the differential are not fully shown.
Figure 1C:
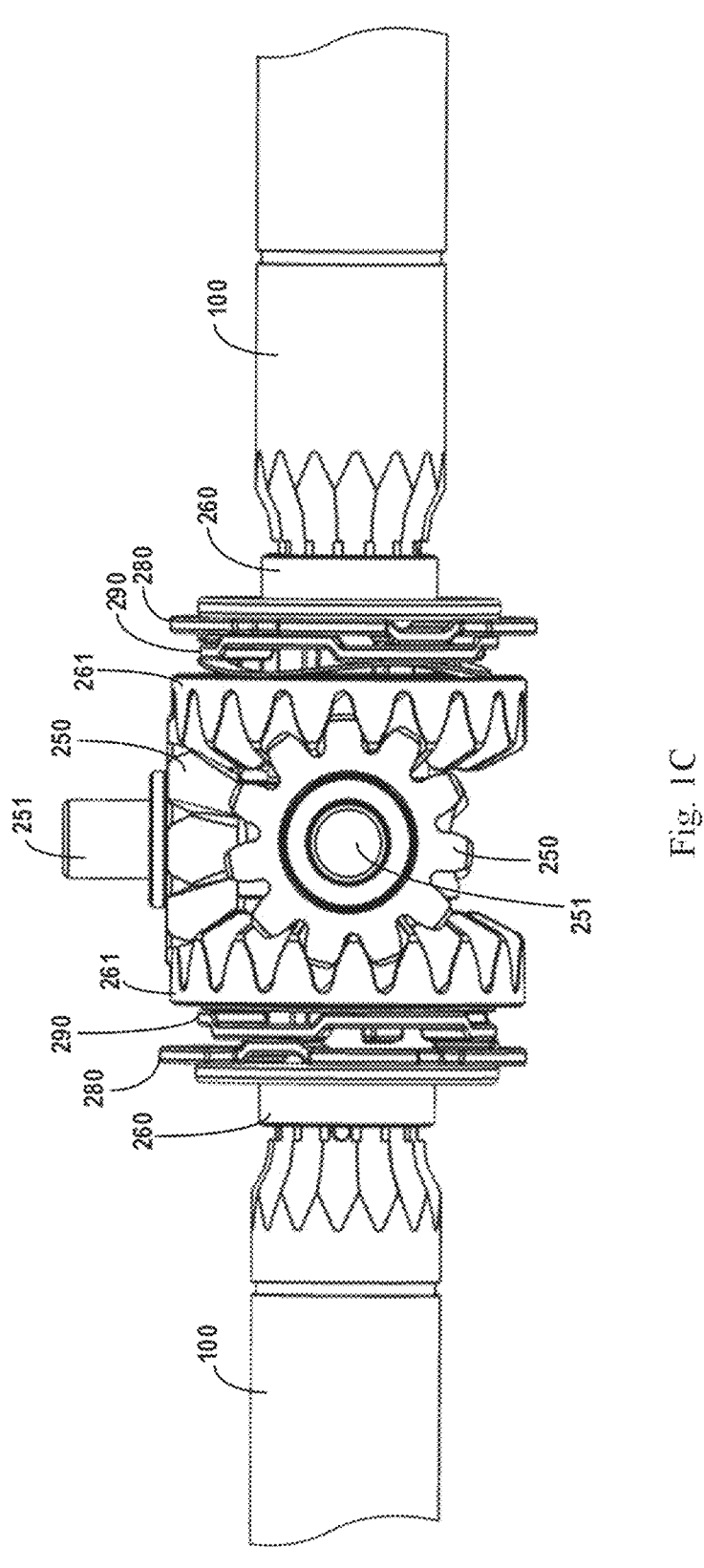
FIG. 1C is a schematic drawing after an outer ring gear in FIG. 1B has been removed, wherein planetary gears are not fully shown, for example, the bottommost planetary gear in the figure being omitted.
Figure 1D:
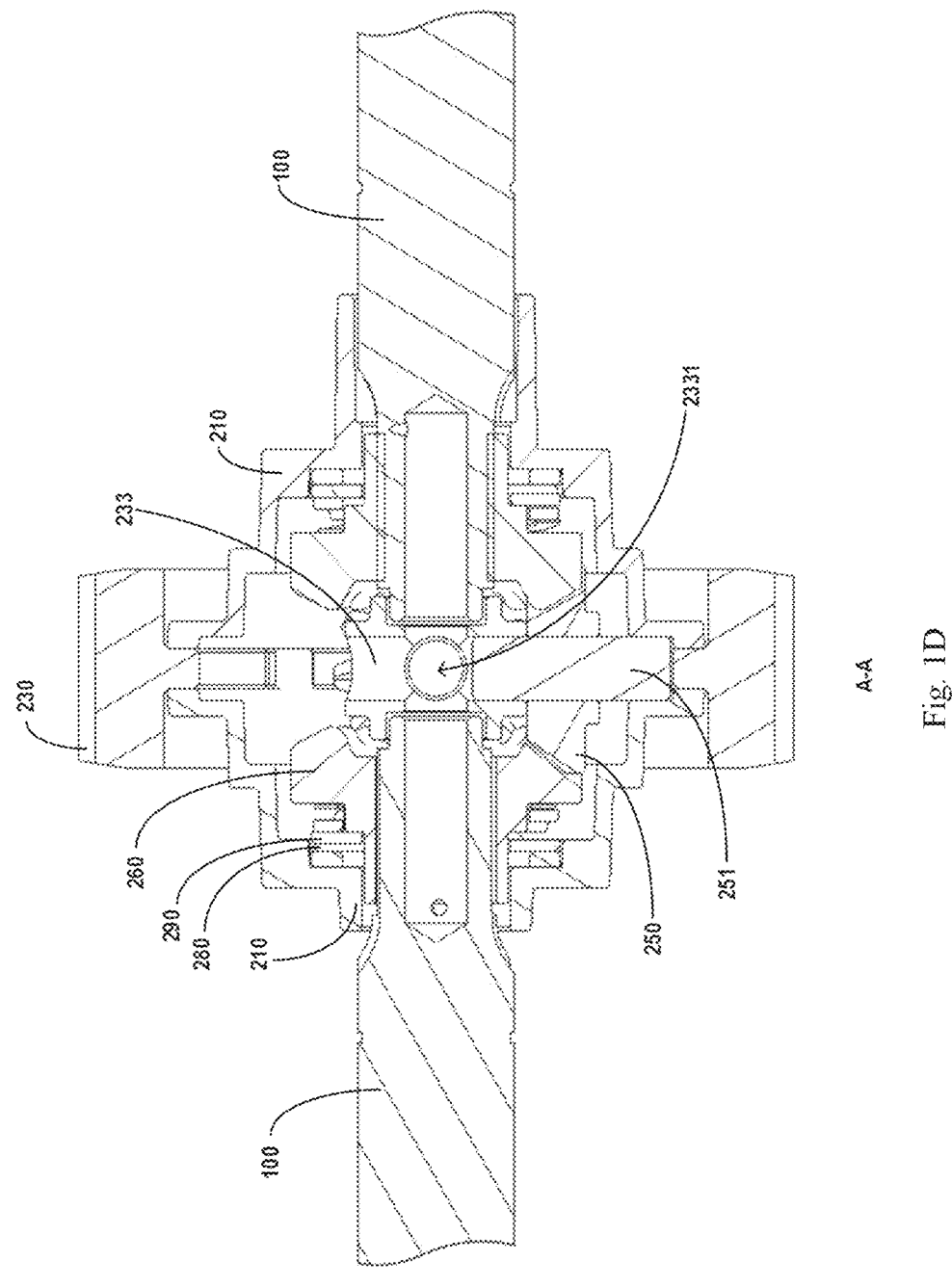
FIG. 1D is a schematic drawing taken along the line A-A in FIG. 1A, wherein the axles on both sides of the differential are not fully shown, and FIG. 1D may also be a schematic drawing taken along any section through an X-axis.
Figure 4:
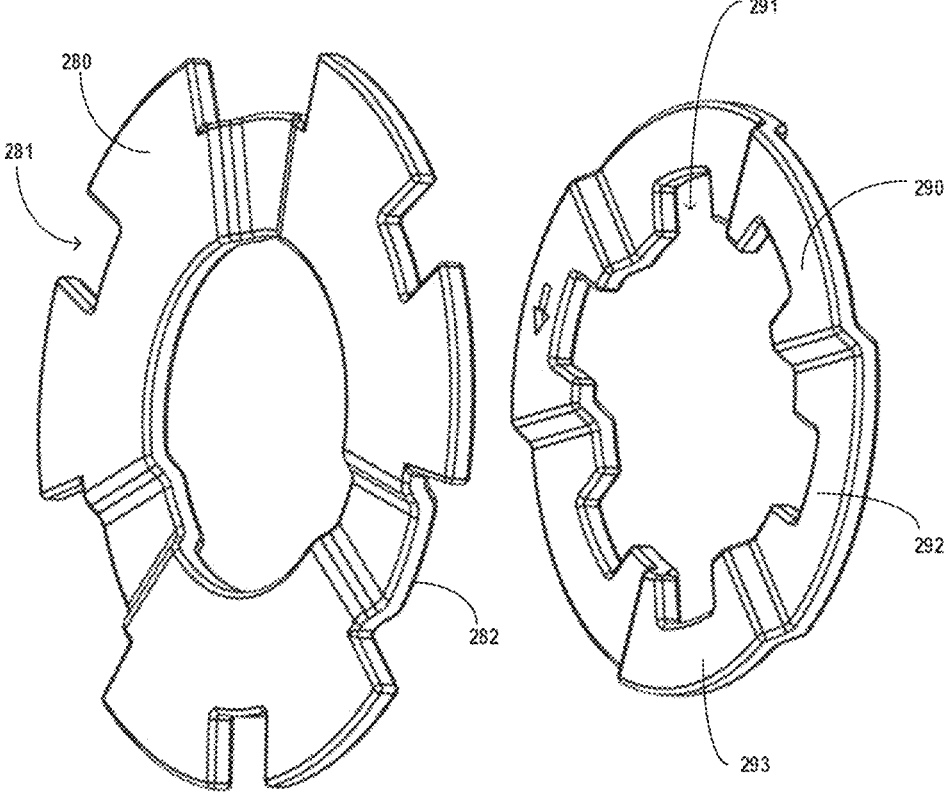
FIG. 4 provides separate 3D views of a first transmission component and a second transmission component in FIG. 3.
Figure 6B:
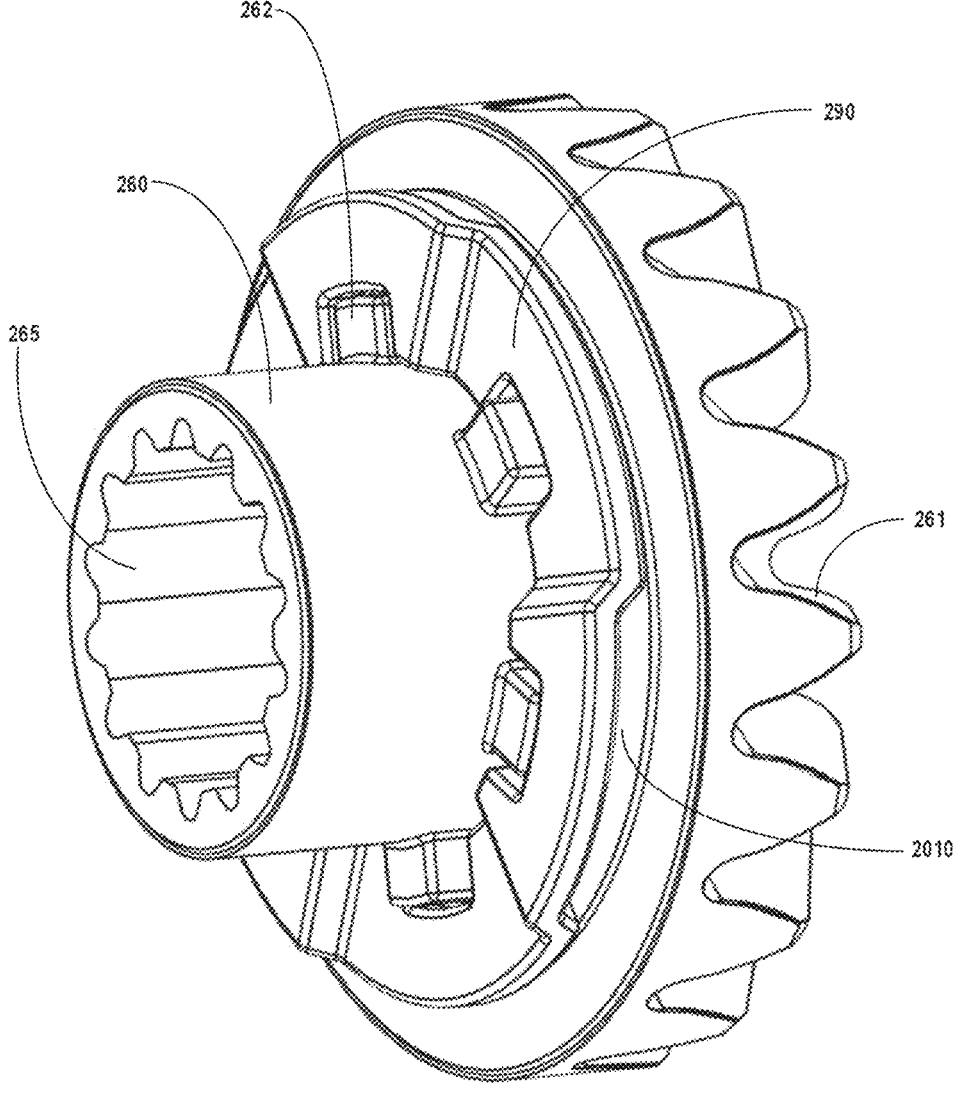
FIG. 6B is a separate assembly schematic drawing of the output gear, the first transmission component and an elastic member in FIG. 6A.

Referring to FIGS. 1B and 3, the transfer of movement of the differential shell 210 to the output gear 260 is achieved by the first transmission component 290 and the second transmission component 280. The first transmission component 290 and the second transmission component 280 are annular plate-shaped structures that are approximately perpendicular to an axis and surround the axis, and, for example, may be ratchet plates. The output gear 260 may comprise an axial outer section 264 and an axial inner section 263 formed as integral whole, an outer diameter of the axial outer section 264 being less than an outer diameter of the axial inner section 263. With reference to FIGS. 4, 6A and 6B, an output gear keying protrusion 262 is formed on the axial outer section 264 of the output gear 260, and a first transmission component keying slot 291 is provided at a corresponding position on the first transmission component 290, and the output gear keying protrusion 262 and the first transmission component keying slot 291 cooperate with each other, such that the first transmission component 290 and the output gear 260 are assembled together.

Figure 5:
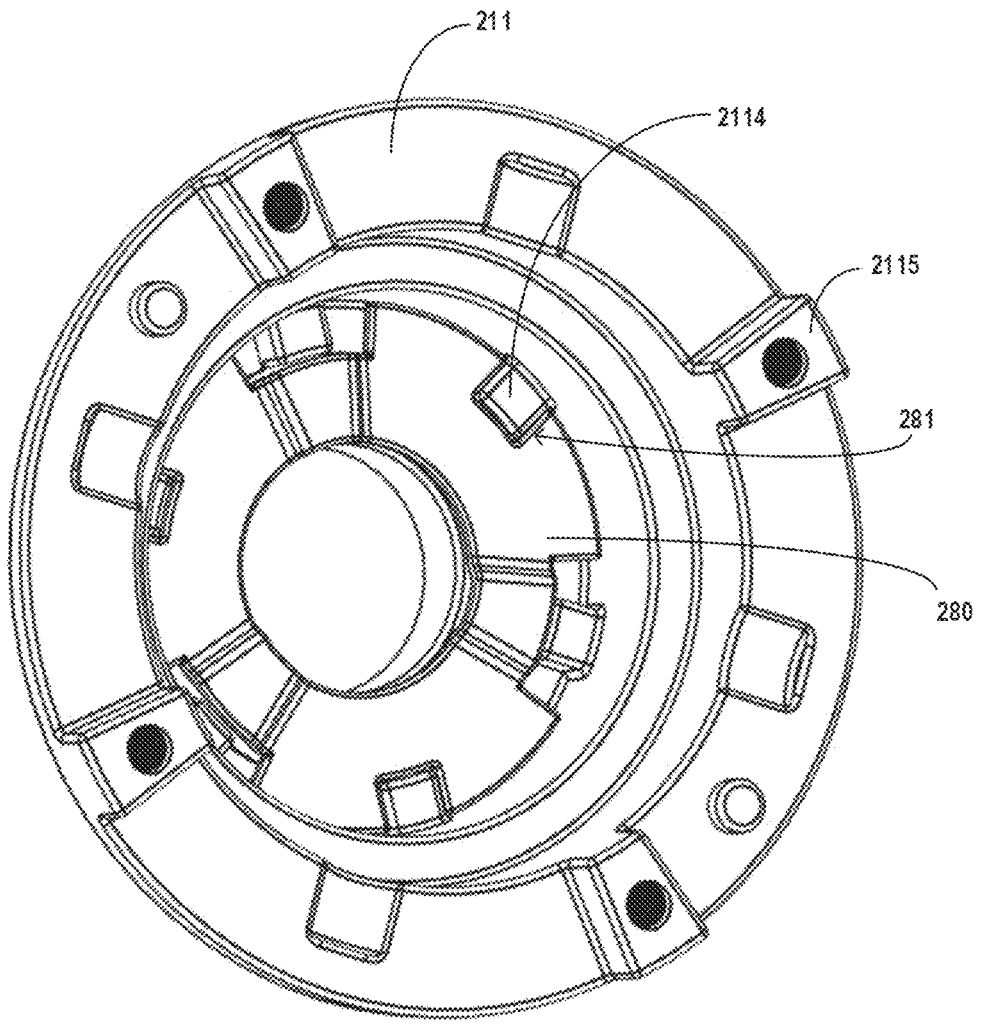
FIG. 5 is a schematic drawing of an engaged state of the second transmission component and a differential shell half.

Referring to FIGS. 4 and 5, the second transmission component 280 is fitted to the inner wall of the differential shell 210. FIG. 5 shows a view of the shell half 211 on the left half of the differential, and this view is seen at an angle from an axial centre toward the axial outer side, that is, seen at an angle from right to left in relation to this shell half 211. For example, an inner surface of an axial end wall of the differential shell 210 is provided with the shell keying protrusion 2114, and a second transmission component keying slot 281 is provided at a corresponding position on the second transmission component 280, and the shell keying protrusion 2114 and the second transmission component keying slot 281 cooperate with each other, such that the second transmission component 280 and the differential shell 210 are fixed relative to each other in the rotation direction. A washer 270 can also be arranged between the second transmission component 280 and the differential shell 210.

Referring to FIGS. 1B, 1E, 3 and 4, the first transmission component 290 and the second transmission component 280 face each other and both surround the axial outer section 264. When meshing of the output gear 260 and a main input mechanism 220 fails, the first transmission component 290 and the second transmission component 280 engage, and the second transmission component 280 in said engaged state drives the first transmission component 290 to rotate. In some embodiments, the second transmission component 280 has a protrusion 282 facing the first transmission component 290, and the first transmission component 290 has a depressed part 292 facing the second transmission component 280; in an engaged state, the protrusion 282 can be located within the depressed part 292, so that the protrusion 282 can abut a circumferential inner wall of the depressed part 292 to drive first transmission component 290 to rotate. The state of the protrusion 282 of the second transmission component 280 inserted into the depressed part 292 of the first transmission component 290 is shown in FIG. 8.

Preferably, a circumferential dimension of the depressed part 292 is greater than a circumferential dimension of the protrusion; such an arrangement also enables the first transmission component 290 and the second transmission component 280 to perform a certain rotational movement relative to each other in the engaged state. Also preferably, the protrusion 282 has a slanted face 283, an end face of the depressed part 292 has a slanted face 294, and the protrusion 282 and the depressed part 292 engage by means of the slanted faces to facilitate the protrusion leaving or entering the depressed part 292, and such an arrangement enables movement input from the second transmission component 280 to the first transmission component 290 to be intermittent; for example, after rotational movement of a wall of the protrusion abutting the depressed part 292 for a certain time, the protrusion may leave the depressed part 292 by means of the slanted face, and then the second transmission component 280 rotates by a certain angle in a predetermined direction relative to the second transmission component 290, and then the protrusion further enters a next depressed part 292 by means of the slanted face, and the wall abutting this depressed part 292 again drives the first transmission component 290 to rotate.

That is, as long as the second transmission component 280 is capable of inputting movement to the first transmission component 290, even if the movement input is intermittent, the first transmission component 290 and the second transmission component 280 are in an engaged state. As mentioned above, in this engaged state, it is not necessary for the protrusion 282 of the second transmission component 280 to remain continuously in the depressed part 292 of the first transmission component 290, nor is it necessary for the slanted face 294 of the depressed part 292 to continuously abut the slanted face 283 of the protrusion 282. In certain other embodiments, when the second transmission component 280 and the first transmission component 290 are in an engaged state, the two may rotate synchronously; for example, the protrusion 282 of the second transmission component 280 may remain continuously in the depressed part 292 of the first transmission component 290, and/or the slanted face 294 of the depressed part 292 continuously abuts the slanted face 283 of the protrusion 282.

In some embodiments, the first transmission component 290 and the output gear 260 can only be fixed to each other in the direction of rotation, but may be slightly displaced relative to each other in the axial direction. For example, an axial gap 2011 may be provided between the first transmission component 290 and an axial inner section 263 of the output gear 260 (see FIG. 8), and an annular elastic member 2010 may be mounted at this axial gap 2011. When the output gear 260 and the planet gear 250 disengage, the output gear 260 moves axially outward, and this axial outward movement squeezes the elastic member 2010, causing the elastic member 2010 to also squeeze the first transmission component 290 axially outward, to facilitate engagement of the first transmission component 290 and the second transmission component 280. The elastic member 2010 springs back to the original state thereof when the protrusion 282 of the second transmission component 280 enters the depressed part of the first transmission component 290 (i.e., the axial gap between the two is reduced). In addition, even with the auxiliary input end and the output gear 260 engaged, since the elastic member 2010 has a certain spring force, the elastic member 2010 still continuously pushes the output gear 260 axially inward, to facilitate the recovery of meshing between the output gear 260 and the planet gear 250 as soon as possible. That is, in some embodiments, the elastic member 2010 has a certain elastic force, regardless of whether the first transmission component 290 and the second transmission component 280 are in the engaged state.

Figure 1E:
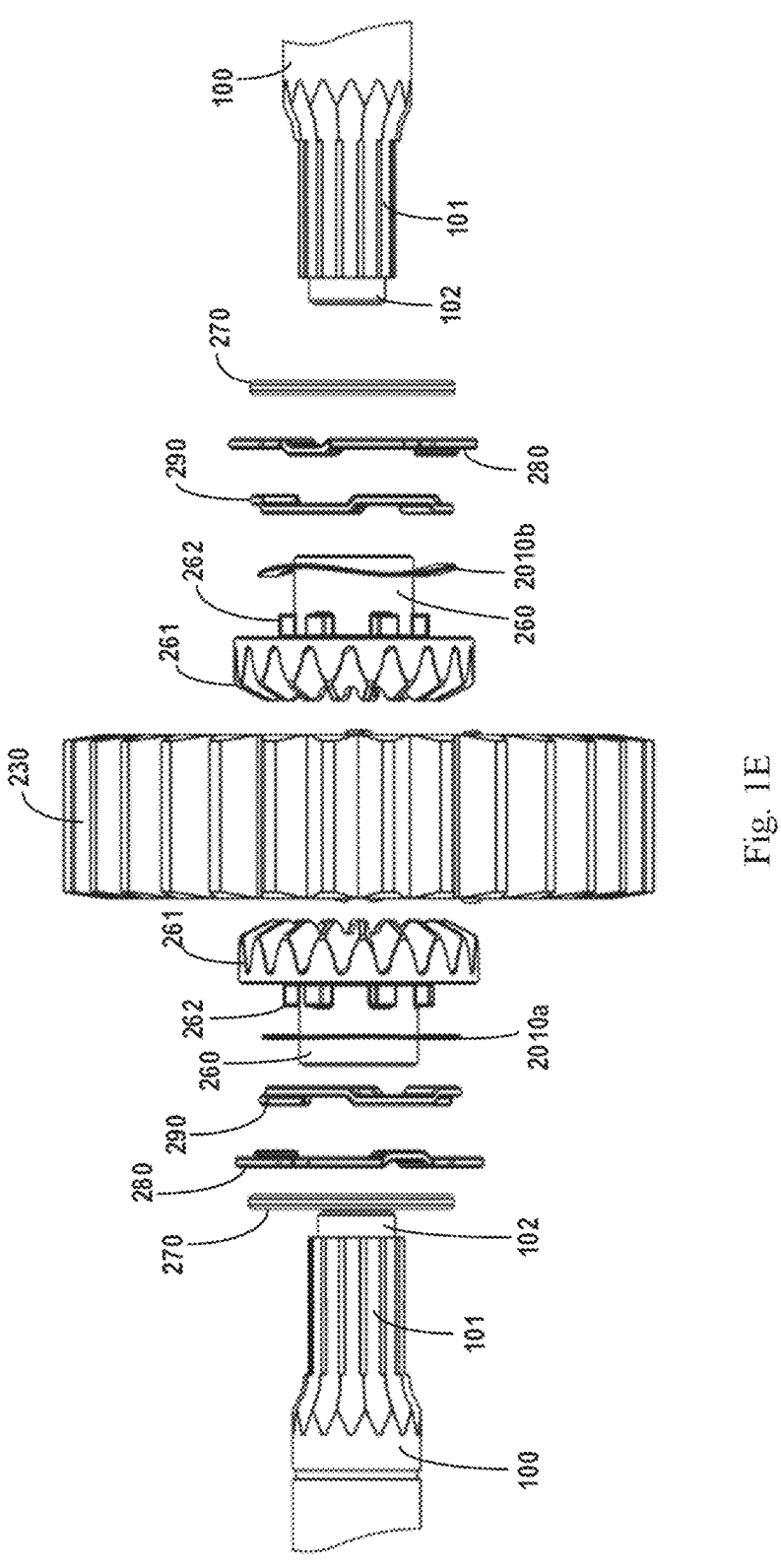
FIG. 1E is an exploded schematic drawing of FIG. 1B, wherein the axles on both sides of the differential are not fully shown.

In this transient state shown in FIG. 1B, the first transmission component 290 and the second transmission component 280 on the right side of the outer ring gear can be in an engaged state, for example, and at this time the protrusion 282 of the second transmission component 280 is located in the depressed part of the first transmission component 290; the first transmission component 290 and the second transmission component 280 on the left side of the outer ring gear can be in a disengaged state, and also, when in an engaged state, the relative rotation of the first transmission component 290 and the second transmission component 280 is exactly such that a state is reached in which the protrusion 282 of the second transmission component 280 is located outside the depressed part of the first transmission component 290. As shown in FIG. 1E, when the protrusion 282 of the second transmission component 280 is located inside the depressed part of the first transmission component 290, an amount of compression of the elastic member 2010 (e.g. a right-side elastic member 2010*b*) is less than an amount of compression of the elastic member 2010 (e.g. a left-side elastic member 2010*a*) when the protrusion 282 of the second transmission component 280 is located outside the depressed part of the first transmission component 290. That is, compared to the left-side elastic member 2010*a*, the right-side elastic member 2010*b* is closer to the original state thereof.

Figure 7:
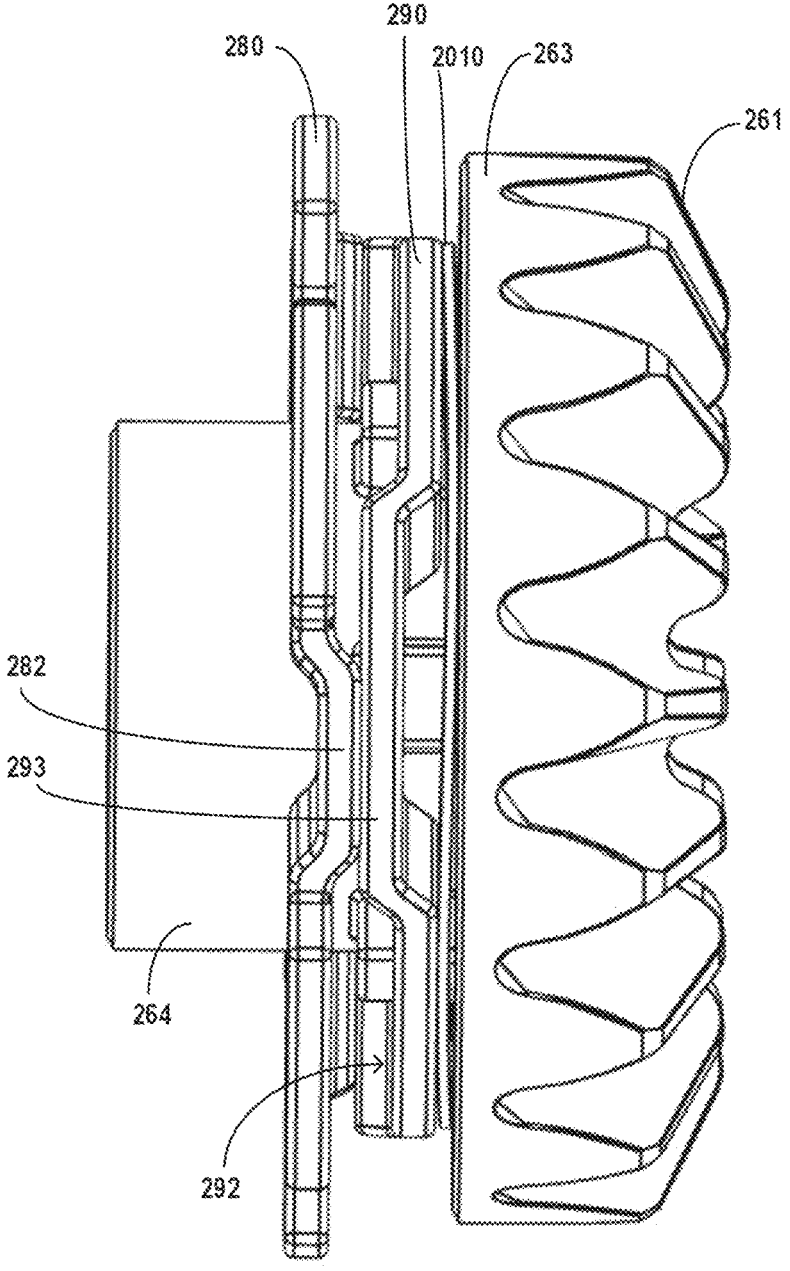
FIG. 7 is a schematic drawing of the fitting-together of the first transmission component, the second transmission component, the elastic member and the output gear from a main viewing angle, wherein the first transmission component and the second transmission component are in a disengaged state.

When the main input end outputs movement to the output gear 260, the auxiliary input end may not input movement to the output gear 260; the positional relationship of the first transmission component 290 and the second transmission component 280 in this state is shown in FIG. 7. Referring to FIGS. 4 and 7, the first transmission component 290 has a base section 293 in addition to the depressed part 292, and this base section 293 protrudes axially outward relative to the depressed part 292. When the first transmission component 290 and the second transmission component 280 are disengaged, the protrusion 282 of the second transmission component 280 fits with the base section 293 of the first transmission component 290. Of course, even if the second transmission component 280 does not transmit movement to the first transmission component 290, the first transmission component 290 and the second transmission component 280 still rotate together.

The present invention also has some other preferred arrangements. For example, returning to FIG. 2, the differential shell 210 has a construction that is adapted to the shape of the output gear 260; for example, the axial inner section 263 and the axial outer section 264 correspond to a step shape of the output gear 260, and a middle section 2112 of the differential shell 210 can also have a similar step-shape configuration.

In other embodiments that are not shown, the present invention may further have other arrangements. For example, the main input end of the input mechanism may be a type of gear other than a planet gear; the auxiliary input end of the input mechanism is also not necessarily a differential shell, and another component may be provided that is fixed relative to an outer tooth width (this outer tooth width meshes with a power source of the differential) to act as the auxiliary input end; meshing between the first transmission component and the second transmission component is also not necessarily achieved by the protrusion cooperating with the depressed part, and the first transmission component and the second transmission component can have another cooperation relationship similar to meshing, attachment cooperation, etc.; and the first transmission component and the second transmission component are also not necessarily annular plate-shaped structures, and the two can have other configurations such as board shapes, block shapes, etc.

The present invention also provides a movable power tool, an example of which is shown in FIG. 9. The garden tool shown in FIG. 9 is a lawnmower 320; in other embodiments, the moveable power tool can also be a snowblower. The lawnmower 320 shown in FIG. 9 is a four-wheel power tool, and this four-wheel power tool has a pair of rear wheels 321 and a pair of front wheels 322, and especially may further comprise a handrail 323 that an operator can hold to operate the power tool. The differential shown in FIGS. 1A-8 can be used to connect the pair of rear wheels 321 to provide a differential function between this pair of rear wheels when one of the rear wheels of the lawnmower 320 slips or idles. The axles 100 on both sides of this differential 200 may respectively be input components for the pair of rear wheels 321 of the lawnmower 320, for example may respectively act as shafts of the pair of rear wheels 321 of the lawnmower 320, or may be connected to shafts of the pair of rear wheels 321 of the lawnmower 320 by means of a transmission, etc. The above description of embodiments of the differential should also be considered a description of embodiments of the moveable power tool.

From the discussion of the above embodiments, it can be seen that the differential of the present invention is capable of enabling an input component to provide power input to an output component at two positions. As soon as a movement input from a main input end to an output component fails, an auxiliary input end acts on the output component to continue to provide a movement input to the output component, and the output component can still rotate with the input component. Therefore, the differential provided by the present invention can guarantee the effectiveness and stability of movement transfer, and reduces the occurrence of slippage. Further, the present invention, in certain aspects, enables engagement failure between the main input end and the output component to cause engagement between the auxiliary input end and the output component, thereby further improving the stability and effectiveness of the movement transfer, and thus further reducing the probability of slippage.

Through the above content, those skilled in the art will easily recognize that alternatives to the structures disclosed in the present invention may be used as feasible alternative embodiments, and embodiments disclosed in the present invention may be combined to produce new embodiments, which likewise fall within the scope of the attached claims.

The invention claimed is:

1. A differential for a moveable power tool, the differential being constructed to be capable of driving axles mounted on both left and right sides thereof to rotate around an axis of the axles, wherein the differential comprises:

an input mechanism, the input mechanism comprising a main input end and an auxiliary input end that rotate as an integral whole around the axis, a differential shell forming the auxiliary input end, and an outer ring gear for receiving outer movement input, the differential shell comprising a pair of shell halves that abut each other in an axial direction, wherein the outer ring gear is at least partially fixed between the pair of shell halves;

an output gear, the output gear and one of the axles being fixedly engaged in a rotation direction, and the output gear being located between the main input end and the auxiliary input end, wherein the output gear is capable of meshing with the main input end;

a first transmission component, the first transmission component and the output gear being fixedly connected to each other in the rotation direction; and a second transmission component, the second transmission component and the auxiliary input end being fixedly connected to each other in the rotation direction, wherein the first transmission component and the second transmission component face each other, and, when meshing of the output gear and the main input end fails, the first transmission component and the second transmission component engage, and the second transmission component in an engaged state drives the first transmission component to rotate in the rotation direction.

2. The differential according to claim 1, wherein an axial displacement gap is provided between the first transmission component and the output gear, an elastic member is provided at the axial displacement gap, and, when the meshing of the output gear and the main input end fails, the output gear squeezes the elastic member so that the first transmission component engages with the second transmission component under an elastic force of the elastic member.

3. The differential according to claim 2, wherein the elastic member is in a compressed state both when the first transmission component and the second transmission component are in the engaged state and a disengaged state.

4. The differential according to claim 1, wherein the first transmission component and the second transmission component form annular plate-shaped structures that are substantially perpendicular to the axis and surround the axis, the second transmission component has a protrusion facing the first transmission component, the first transmission component has a depressed part facing the second transmission component, and, in the engaged state, the protrusion can be located within the depressed part, and a circumferential dimension of the depressed part is greater than a circumferential dimension of the protrusion.

5. The differential according to claim 4, wherein the protrusion and the depressed part engage by means of slanted faces to facilitate the protrusion leaving or entering the depressed part.

6. The differential according to claim 1, wherein the input mechanism comprises:

a planetary gear system that is located at an axial centre position of the differential shell, the planetary gear system comprising:

the outer ring gear; and multiple planet gears that are mounted on a radial inner side of the outer ring gear, the multiple planet gears forming the main input end.

7. The differential according to claim 6, wherein the multiple planet gears are bevel gears, a self-rotating shaft of each of the planet gears extends in a radial direction, and axial inner end teeth of the output gear also correspondingly forms a bevel gear.

8. The differential according to claim 7, wherein the differential further comprises a central assembly member located at the axial centre position thereof, wherein a radial outer end of each of the self-rotating shafts is inserted in a corresponding receiving hole of the outer ring gear, and a radial inner end of each of the self-rotating shafts is inserted in a self-rotating shaft mounting hole of the central assembly member.

9. The differential according to claim 8, wherein an axial inner end of one of the driving axles is inserted in the corresponding receiving hole of the central assembly member.

10. The differential according to claim 1, wherein the output gear comprises an axial outer section and an axial inner section formed as an integral whole, an outer diameter of the axial outer section being less than an outer diameter of the axial inner section, and both the first transmission component and the second transmission component surrounding the axial outer section.

11. The differential according to claim 10, wherein the auxiliary input end forms the differential shell having a stepped construction that is adapted to the shape of the output gear.

12. The differential according to claim 10, wherein one of the axles runs through the whole of the output gear and engages with inner teeth of the output gear.

13. The differential according to claim 1, wherein the first transmission component and the output gear are fixed in a keying manner, and/or the second transmission component and the auxiliary input end are fixed in a keying manner.

14. A moveable power tool, wherein the moveable power tool comprises the differential and the axles mounted on both the left and right sides of the differential according to claim 1.

15. The moveable power tool according to claim 14, wherein the moveable power tool is a lawnmower or a snowblower.

* * * * *